June 13, 1939. H. T. WINTERBAUER Re. 21,115

PLAYING BALL

Original Filed Nov. 5, 1934 4 Sheets-Sheet 1

Inventor:
Henry T. Winterbauer,
By Wyman, Smith, Lee, Christy & Miles,
Attys.

June 13, 1939. H. T. WINTERBAUER Re. 21,115.

PLAYING BALL

Original Filed Nov. 5, 1934 4 Sheets-Sheet 2

Inventor:
Henry T. Winterbauer,
By Dyrenforth, Lee, Christner & Miles,
Attys.

June 13, 1939. H. T. WINTERBAUER Re. 21,115

PLAYING BALL

Original Filed Nov. 5, 1934 4 Sheets-Sheet 3

Inventor:
Henry T. Winterbauer,
By Dyrenforth, Lee, Chatton & Wiles,
Attys.

June 13, 1939. H. T. WINTERBAUER Re. 21,115

PLAYING BALL

Original Filed Nov. 5, 1934 4 Sheets-Sheet 4

Inventor:
Henry T. Winterbauer,
By Dyrnforth, Lee, Christy & Miles,
Attys.

Reissued June 13, 1939

Re. 21,115

UNITED STATES PATENT OFFICE 21,115

PLAYING BALL

Henry T. Winterbauer, Chicago, Ill., assignor, by direct and mesne assignments, to John T. Clark Company, Chicago, Ill., a corporation of Illinois Original No. 2,061,604, dated November 24, 1936, Serial No. 751,619, November 5, 1934. Application for reissue February 26, 1938, Serial No. 192,894

24 Claims. (Cl. 273—65)

Figure 1:
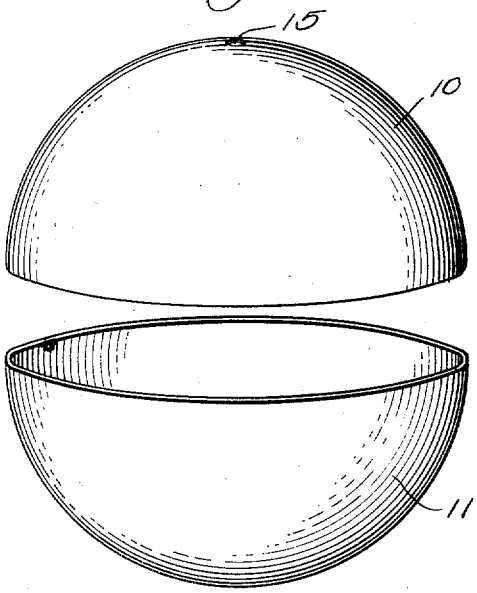

This invention relates to improvements in method of and apparatus for making playing balls and, more especially, to thin walled inflated or inflatable balls, like basketballs and footballs.

Among the features of my invention is the making of such a ball with a seamless rubber cover. By the use of my invention, it will be possible to make a ball more cheaply than balls as heretofore made with sewn leather covers. A rubber cover will also make the ball much more resistant to wear from usage, especially on rough surfaces such as concrete, macadam, and the like.

Another feature of my invention is the making of a ball that will keep its original shape with hard long usage. It has been found that leather-covered balls as heretofore made have frequently become quickly distorted in use owing to the seams and unevennesses in the leather employed. This objection is eliminated by a seamless one-piece rubber cover on my improved ball.

Another feature of my invention is the provision of a ball that is highly resistant to damage from moisture. The one-piece rubber cover on my improved ball is practically entirely moisture-proof.

A further advantage arising from my invention is that since the outside cover, or at least the outer surface thereof, has not much to do with strengthening the ball, the ball can be used even after such cover is considerably thinned by wear without danger of the ball breaking. It has been found that if the outer surface of a leather ball is worn only to a slight amount, the strength of the ball is very much lessened.

The rubber cover also provides the new ball with higher friction or non-skid qualities so that a bounce pass from the floor can be made with greater accuracy. A leather ball, when bounced on a slippery floor, has a tendency to skid to a certain extent, making it harder to direct the pass. My improved ball with a rubber cover, upon engaging a back board, will also be given a certain amount of spin.

My improved ball having no seams in the outer cover will always rebound at substantially the correct angle as it hits the floor, while a leather ball is deflected to a certain extent, depending upon whether it strikes the floor on a seam, between seams, or at the end where the seams are centered. In other words, my improved ball will take a more uniform bounce than balls of the prior art.

In speaking of a rubber cover, I means to include various well-known rubber compositions, rubber compounds, and the like, having both natural and synthetic rubber, and the equivalents of such materials, compositions and compounds. By the use of these materials, the liveliness or resiliency of the ball can be varied by varying the composition of the material. By molding the outer cover, the inaccuracies due to sewing are avoided and it is possible to make a more perfect sphere or other shape desired. Lower grade balls and seconds may be thus lessened or eliminated. Since the cover is made seamless and the construction is uniform throughout, the ball has a substantially identical resiliency at any point, whereas a ball with a sewn cover ordinarily has less rebound when it strikes on a seam or seams as compared to when it strikes in the center of a panel. The uniform construction of my improved ball also gives it a substantially perfect balance.

The use of rubber or similar material in the cover also gives greater adherent qualities, making it easier to hold or grip the ball, thus avoiding possibility of fumbles.

Other features and advantages of my invention will appear more fully as I proceed with my specification.

In those forms of devices embodying the features of my invention shown in the accompanying drawings—

Figure 2:
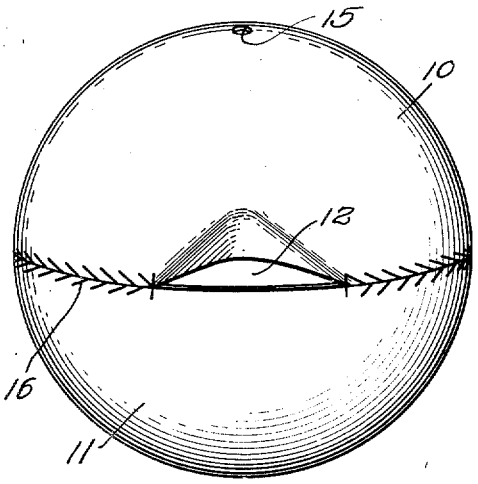
Figure 3:
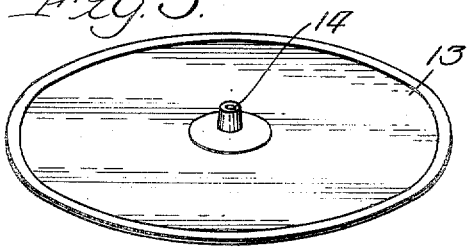
Figure 4:
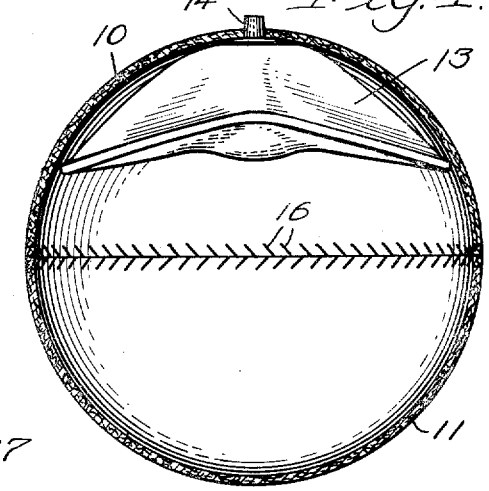
Figure 5:
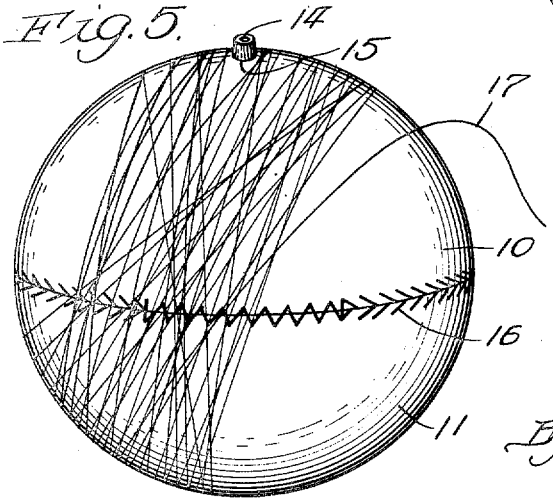
Figure 6:
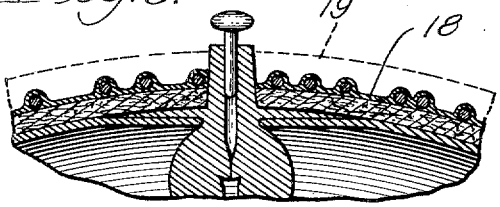
Figure 8:
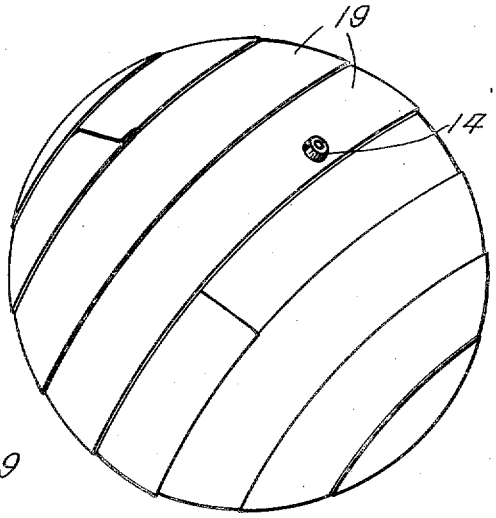
Figure 7:
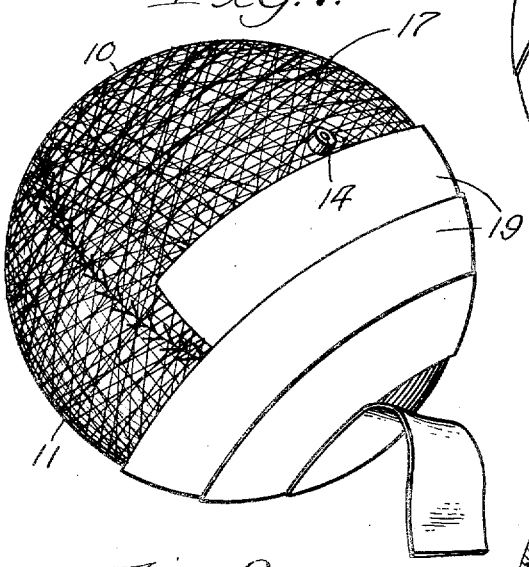
Figure 10:
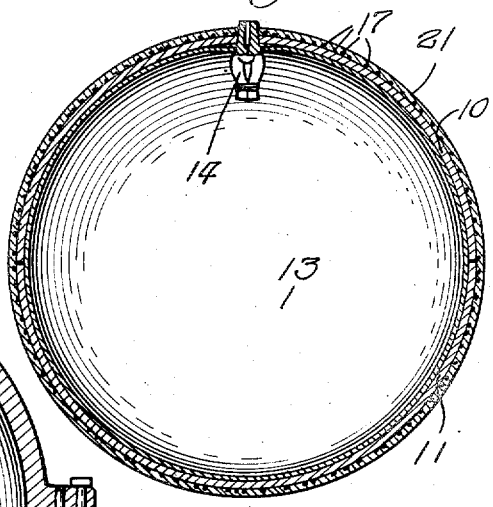
Figure 9:
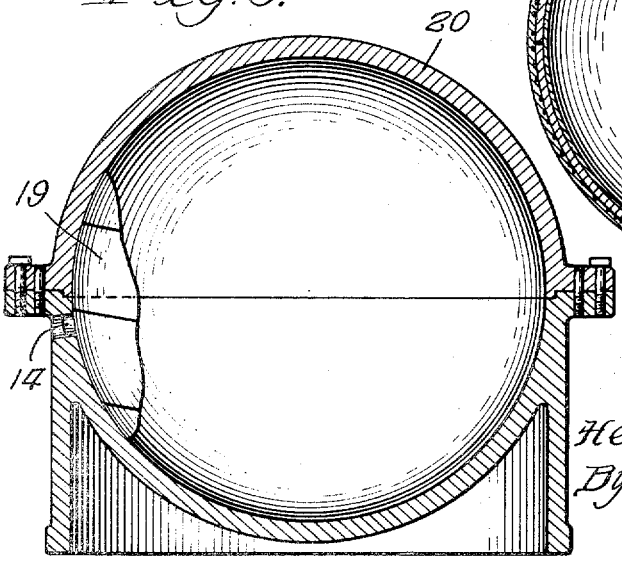
Figure 11:
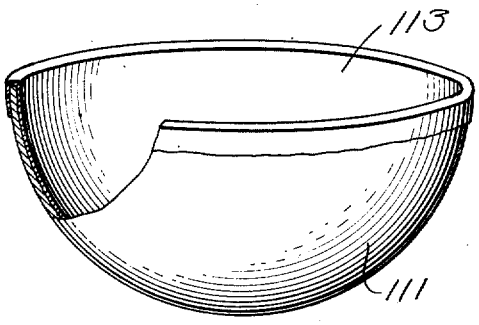
Figure 12:
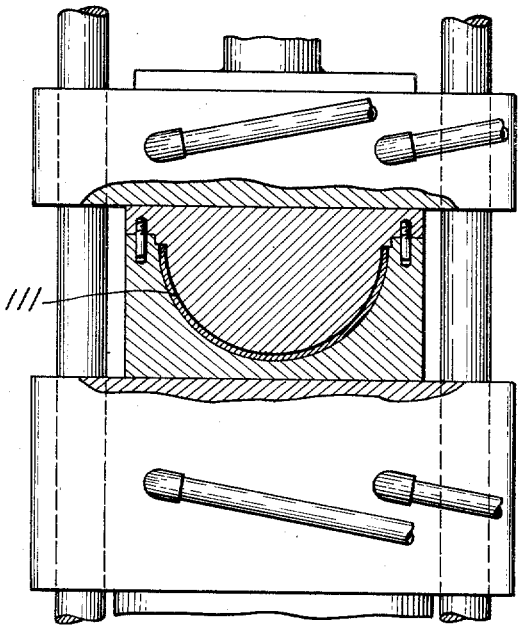
Figure 13:
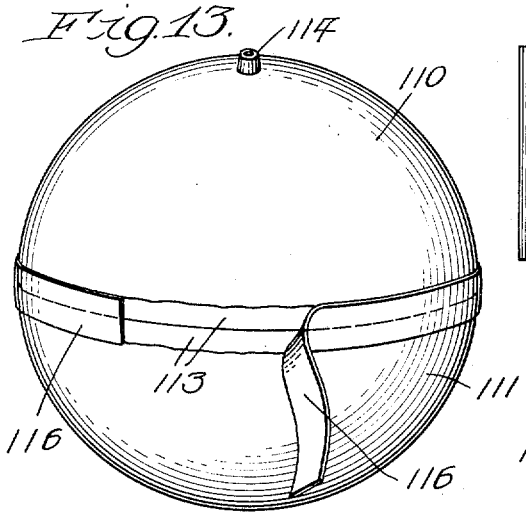
Figure 14:
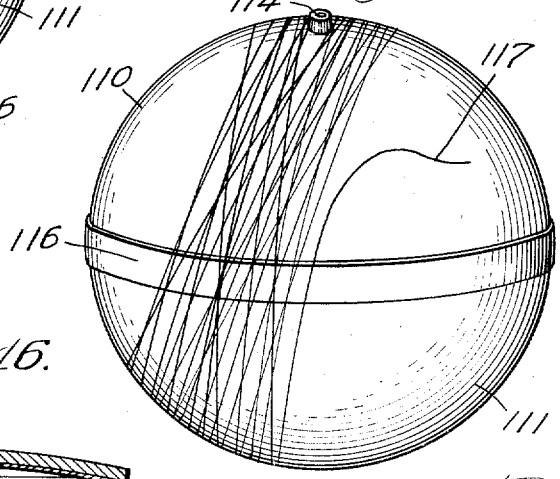
Figure 15:
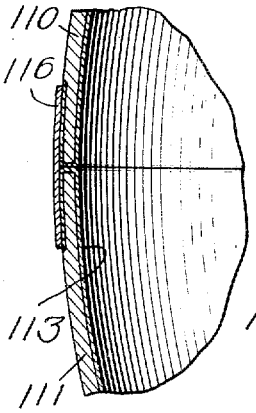
Figure 16:
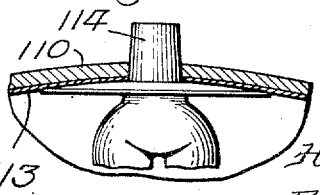
Figure 17:
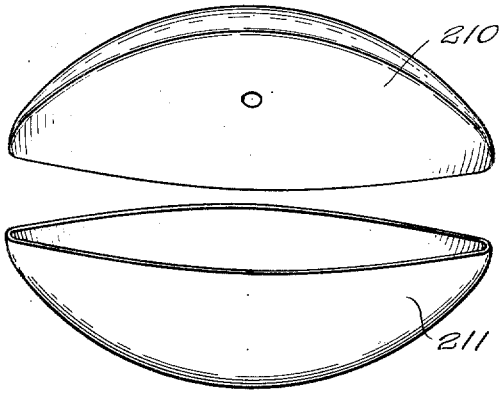

Figure 1 is a view in perspective of the two hemispherical preshaped inner members used in making the ball; Fig. 2 shows the same sewn together, except for a small opening to permit insertion of the bladder; Fig. 3 shows the bladder; Fig. 4 is a sectional view showing the bladder in the hemispherical members after they are completely sewn together; Fig. 5 shows a partial winding of the elongated reinforcement in the form of a cord; Fig. 6 is a vertical sectional view through the valve after the cord has been applied and coated with rubber; Fig. 7 shows the cord completely applied and coated with rubber and the partial application of the outside rubber cover in the form of a strip or band of uncured rubber; Fig. 8 shows the rubber cover completely applied before curing; Fig. 9 is a vertical sectional view of the mold in which the outer cover is cured; Fig. 10 is a vertical sectional view of the completed ball after curing of the outer cover; Fig. 11 is a perspective view of one of the inner hemispherical members showing a modified method of forming the ball; Fig. 12 shows said member in a press; Fig. 13 shows two of such members joined by a tape; Fig. 14 shows the partial winding of a cord on said members; Fig. 15 is a vertical sectional view through the members where they are joined; Fig. 16 is a similar view showing the valve; Figs.

Figure 22:
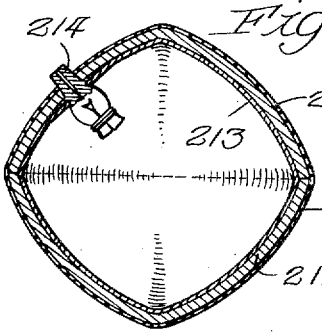

17, 18, 19, 20, and 21 are views like Figs. 1, 2, 3, 4, and 5, respectively, showing the making of a football; and Fig. 22 is a vertical sectional view through the completed football.

As shown in the drawings, in the making of a basketball, there are first formed two hemispherical inner members of substantially non-stretchable, flexible sheet material. These members are indicated in Fig. 1 by 10 and 11, and the same may be formed of felt, canvas, or the like. I have found felt very adaptable for the purpose as it can be shaped in the same manner as a hat is formed or shaped. As shown in Fig. 1, two such preshaped hemispherical members or bowls are formed and they are sewn together as shown in Fig. 2 to form a hollow spherical inner member of substantially non-stretchable preshaped flexible sheet material. In practice, it is advisable to sew the two members together, as shown in Fig. 2, with the exception of a small opening 12 to permit insertion of a bladder 13, the valve stem 14 of the same being projected through a suitable opening 15 in the member 10. The hole 12 is then sewn shut to complete the formation of the hollow spherical inner member.

After the inner member is formed as shown in Fig. 4, with the bladder inside, the latter is inflated with air to a relatively low pressure, for example, about two pounds. The pressure should be enough to hold the inner spherical member formed by the cups 10 and 11 in spherical form but should not be so great as to tear or strain the material or the stitching 16 by which such members are sewn together. The inner member is then wound with an elongated reinforcement, here shown in the form of a cord 17. Fig. 5 shows this cord partially wound on and Fig. 7 shows the winding of the cord completed. This cord serves to reinforce the inner spherical member. Each wrap or winding of the cord is substantially on a great circle.

After the winding of the cord, the ball is preferably coated with rubber or rubber compound, as shown in Fig. 6 and as indicated by 18. This may be accomplished by dipping, spraying or by applying thin sheets of uncured rubber or rubber compound over the inner member and the cords. This rubber coating preferably surrounds the cords, impregnates the same and adheres to and coats the outer surfaces, at least, of the two cups 10 and 11 forming the spherical inner member.

The next step consists in applying the outer rubber cover. This may be accomplished in a variety of ways. For example, as here shown, I wind over the ball one or more strips or sheets of uncured rubber 19. The ball is then placed in a suitable spherical mold 20 and heat applied to cure the same. The curing operates to cure not only the outer application of rubber 19 but, also, the thinner inner coating 18, if such an inner coating has been applied. It is obvious, however, that the inner coating 18 may be omitted and the outer rubber cover applied in only one coating. Also, if desired, the inner coating 18 may first be cured and then the outer coating 19 applied and cured. In any event, after the final curing, the ball is provided with a one-piece seamless cured rubber cover which I have designated in Fig. 10 by the numeral 21. If an inner coating 18 was applied first and the two coatings cured together, the rubber material 18 and 19 will flow together during the curing process to form a single rubber cover and it will be found that the reinforcing cords 17 are imbedded in this cover, as shown in Fig. 10.

In Figs. 11 to 16, inclusive, I have shown a modification in the method of forming the inner member. As here shown, I form two cup-shaped members 110 and 111 of preshaped substantially non-stretchable flexible sheet material, such as felt, canvas, or the like, similar to the members 10 and 11, but instead of placing a bladder inside of these, I coat their inner surfaces with rubber 113 in order to make them air-tight. The rubber coating may then be cured in a press, as shown in Fig. 12. I then place them together to form the sphere and seal the joint with a tape 116, which may be cemented or vulcanized in place. The upper member 110 is provided with a hole containing the valve 114. The inner member is thus rendered air-tight and inflated to a low pressure, for example, about two pounds, to hold it in spherical form, as shown in Fig. 14. It is then wound with a reinforcing cord 117 and from that point on, the construction of the basketball is the same as above described.

Figure 18:
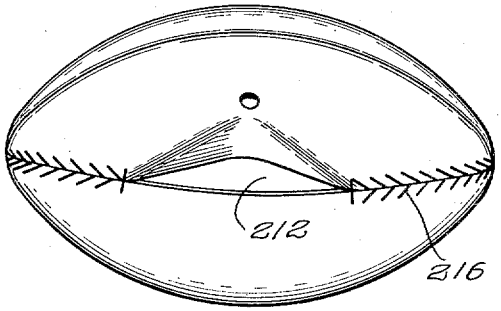
Figure 19:
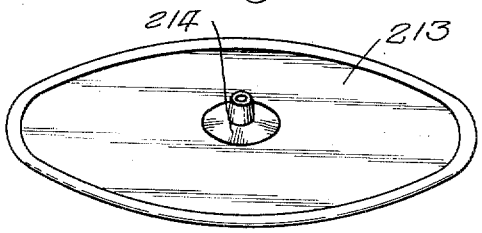
Figure 20:
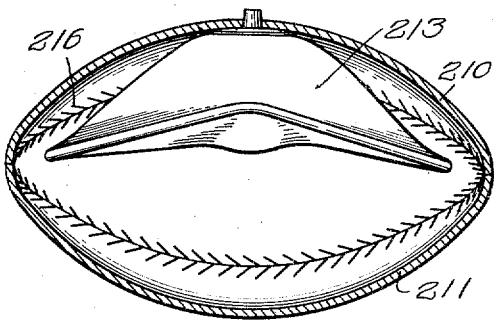
Figure 21:
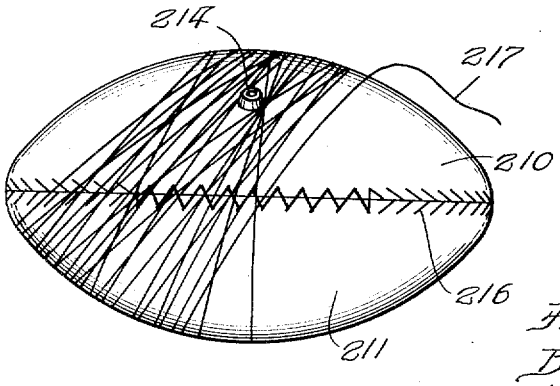

In Figs. 17 to 22, I have shown the formation of a football. As here shown, two hollow members 210, 211 are preshaped by pressing felt, canvas, or the like, so that when the two halves are sewn together, as shown in Fig. 18, the inner member will be in the shape of a football. The two halves are joined by stitching 216, leaving an opening 212 for the insertion of the bladder 213. The stitching is then completed and the bladder inflated to a relatively low pressure to hold the inner member in proper shape, as shown in Fig. 21, and a reinforcing cord 217 is wound around. From this point on, the construction is the same as above described and Fig. 22 shows a sectional view of the completed football with the outer rubber cover 221 applied and the cord 217 imbedded therein.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

Heretofore I have spoken of wrapping or winding the cord on the inner member. This wrapping or winding is continued to substantially cover said inner member. In stating that said winding substantially covers the inner member, I mean that the winding is continued and enough turns put on so that there are practically no spaces on the inner member left exposed where the cords are much more than ⅛ to ¼ inch apart. In the wrapping or winding care is also taken to distribute the crossings or intersections of the cord as much as possible so that the cord will not pile up unduly at any one spot.

I have found that the preshaped, non-stretchable, flexible sheet material such as 10, 110, and 210, serves to prevent the complete ball from being too resilient or too lively. In a basketball, for example, the height of bounce of the ball when inflated to a certain pressure must be within certain limits. Heretofore, in making molded rubber balls, difficulty has been encountered in getting the ball "dead" enough. When the desired air pressure was put in the ball it was found to be too lively or too resilient; that is, it would bounce too high. By the use of non-stretchable, flexible sheet material in the making of the ball it is considerably "deader" than without such material. Consequently, the use of non-stretchable, flexible sheet material is a great improvement over anything shown in the prior art, especially in connection with controlling the "deadness" of the ball.

What I claim as new, and desire to secure by Letters Patent, is:

1. The method of making a thin walled inflatable playing ball, comprising: making a hollow inner member of substantially non-stretchable flexible sheet material; expanding said member by a relatively low internal pressure; winding an elongated reinforcement around said member substantially on great circles to substantially cover the same; and curing a rubber cover over said member and reinforcement.

2. The method of making a thin walled inflatable playing ball, comprising: making a hollow inner member of substantially non-stretchable preshaped flexible sheet material; expanding said member by a relatively low internal pressure; winding an elongated reinforcement around said member substantially on great circles to substantially cover the same; and curing a rubber cover over said member and reinforcement.

3. The method of making a thin walled inflatable playing ball, comprising: making a hollow inner member of substantially non-stretchable flexible sheet material; expanding said member by a relatively low internal pressure; winding an elongated reinforcement around said member substantially on great circles to substantially cover the same; and curing a rubber cover over said member and reinforcement, said rubber cover imbedding said reinforcement therein.

4. The method of making a thin walled inflatable playing ball, comprising: making a hollow inner member of substantially non-stretchable preshaped flexible sheet material; expanding said member by a relatively low internal pressure; winding an elongated reinforcement around said member substantially on great circles to substantially cover the same; and curing a rubber cover over said member and reinforcement, said rubber cover imbedding said reinforcement therein.

5. The method of making a thin walled inflatable playing ball, comprising: preshaping flexible substantially non-stretchable sheet material to the desired shape of the completed ball; expanding said member by a relatively low internal pressure, winding an elongated reinforcement around said member substantially on great circles to substantially cover the same; and curing a rubber cover over said member and reinforcement.

6. The method of making a thin walled inflatable playing ball, comprising: preshaping flexible substantially non-stretchable sheet material to the desired shape of the completed ball; expanding said member by a relatively low internal pressure; winding an elongated reinforcement around said member substantially on great circles to substantially cover the same; and curing a rubber cover over said member and reinforcement, said rubber cover imbedding said reinforcement therein.

7. A thin walled inflatable playing ball, including: a hollow inner member of substantially non-stretchable flexible sheet material; an elongated reinforcement wound around said inner member substantially on great circles substantially covering the same; and a rubber cover over said member and said reinforcement.

8. A thin walled inflatable playing ball including: a hollow inner member of substantially non-stretchable preshaped flexible sheet material; an elongated reinforcement wound around said inner member substantially on great circles substantially covering the same; and a rubber cover over said member and said reinforcement.

9. A thin walled inflatable playing ball including a hollow inner member of substantially non-stretchable flexible sheet material; an elongated reinforcement wound around said inner member substantially on great circles substantially covering the same; and a rubber cover cured over said member and said reinforcement.

10. A thin walled inflatable playing ball including: a hollow inner member of substantially non-stretchabe preshaped flexible sheet material; an elongated reinforcement wound around said inner member substantially on great circles substantially covering the same; and a rubber cover cured over said member and said reinforcement.

11. A thin walled inflatable playing ball including: a hollow inner member of substantially non-stretchable flexible sheet material; an elongated reinforcement wound around said inner member substantially on great circles substantially covering the same; and a rubber cover cured over said member and said reinforcement, said rubber cover having said reinforcement imbedded therein.

12. A thin walled inflatable playing ball including: a hollow inner member of substantially non-stretchable preshaped flexible sheet material: an elongated reinforcement wound around said inner member substantially on great circles substantially covering the same; and a rubber cover cured over said member and said reinforcement, said rubber cover having said reinforcement imbedded therein.

13. A thin walled inflatable playing ball including: a hollow inner member of substantially non-stretchable flexible sheet material preshaped to the desired shape of the completed ball; an elongated reinforcement wound around said inner member substantially on great circles substantially covering the same; and a rubber cover over said inner member and said reinforcement.

14. A thin walled inflatable playing ball including: a hollow inner member of substantially non-stretchable flexible sheet material preshaped to the desired shape of the completed ball; an elongated reinforcement wound around said inner member substantially on great circles substantially covering the same; and a rubber cover cured over said inner member and said reinforcement.

15. A thin walled inflatable playing ball including: a hollow inner member of substantially non-stretchable flexible sheet material preshaped to the desired shape of the completed ball; an elongated reinforcement wound around said inner member substantially on great circles substantially covering the same; and a rubber cover cured over said inner member and said reinforcement, said rubber cover having said reinforcement imbedded therein.

16. The method of making a thin walled inflatable playing ball, comprising: preshaping portions of substantially non-stretchable flexible sheet material; attaching said portions together to form an inner member having the desired shape of the completed ball; expanding said member by a relatively low internal pressure; winding an elongated reinforcement around said member substantially on great circles to substantially cover the same; and curing a rubber cover over said member and reinforcement.

17. The method of making a thin walled inflatable playing ball, comprising: preshaping portions of substantially non-stretchable flexible sheet material; attaching said portions together to form an inner member having the desired shape of the completed ball; expanding said member by a relatively low internal pressure; winding an elongated reinforcement around said member substantially on great circles to substantially cover the same; and curing a rubber cover over said member and reinforcement, said rubber cover imbedding said reinforcement therein.

18. A thin walled inflatable playing ball, including: a hollow inner member made of joined portions of substantially non-stretchable flexible sheet material preshaped to give said member the desired shape of the completed ball; an elongated reinforcement wound around said inner member substantially on great circles substantially covering the same; and a rubber cover over said member and said reinforcement.

19. A thin walled inflatable playing ball, including: a hollow inner member made of joined portions of substantially non-stretchable flexible sheet material preshaped to give said member the desired shape of the completed ball; an elongated reinforecement wound around said inner member substantially on great circles substantially covering the same; and a rubber cover cured over said member and said reinforcement.

20. A thin walled inflatable playing ball, including: a hollow inner member made of joined portions of substantially non-stretchable flexible sheet material preshaped to give said member the desired shape of the completed ball; an elongated reinforcement wound around said inner member substantially on great circles substantially covering the same; and a rubber cover cured over said member and said reinforcement, said rubber cover having said reinforcement imbedded therein.

21. The method of making a thin walled inflatable playing ball, comprising: making a hollow inner member of substantially non-stretchable flexible sheet material; expanding said member by relatively low internal pressure; placing an elongated reinforcement on said member substantially on a great circle; and curing a rubber cover over said member and reinforcement.

22. A thin walled inflatable playing ball, including: a hollow inner member of substantially non-stretchable flexible sheet material; an elongated reinforcement on said inner member substantially on a great circle; and a rubber cover over said member and said reinforcement.

23. The method of making a thin walled inflatable playing ball, comprising: making a hollow inner member of substantially non-stretchable flexible sheet material; expanding said member by relatively low internal pressure; placing an elongated reinforcement on said member substantially on a great circle; and placing a cover over said member and reinforcement.

24. A thin walled inflatable playing ball, including: a hollow inner member of substantially non-stretchable flexible sheet material; an elongated reinforcement on said inner member substantially on a great circle; and a cover over said member and said reinforcement.

HENRY T. WINTERBAUER.